United States Patent
Sokolov et al.

(10) Patent No.: US 10,819,707 B1
(45) Date of Patent: Oct. 27, 2020

(54) SYSTEMS AND METHODS FOR VALIDATING A USER'S PHYSICAL LOCATION

(71) Applicant: Symantec Corporation, Mountain View, CA (US)

(72) Inventors: Ilya Sokolov, Boston, MA (US); Keith Newstadt, Newton, MA (US)

(73) Assignee: NortonLifeLock, Inc., Tempe, AZ (US)

( * ) Notice: Subject to any disclaimer, the term of this patent is extended or adjusted under 35 U.S.C. 154(b) by 105 days.

(21) Appl. No.: 15/798,433

(22) Filed: Oct. 31, 2017

(51) Int. Cl.
*G06F 21/00* (2013.01)
*H04L 29/06* (2006.01)
*H04L 29/08* (2006.01)
*H04L 12/28* (2006.01)

(52) U.S. Cl.
CPC ........ *H04L 63/0876* (2013.01); *H04L 12/282* (2013.01); *H04L 12/2809* (2013.01); *H04L 12/2825* (2013.01); *H04L 63/107* (2013.01); *H04L 67/18* (2013.01)

(58) Field of Classification Search
CPC .................................................. H04L 63/0876
USPC .............................................................. 726/6
See application file for complete search history.

(56) References Cited

U.S. PATENT DOCUMENTS

| | | | |
|---|---|---|---|
| 9,578,399 B2* | 2/2017 | Mullins | G06T 11/60 |
| 9,781,602 B1* | 10/2017 | Girdhar | H04W 4/70 |
| 10,152,838 B2* | 12/2018 | Einberg | G06F 21/32 |
| 2007/0184817 A1* | 8/2007 | Karaoguz | H04L 63/0492 455/411 |
| 2010/0174649 A1* | 7/2010 | Bouchard | G06F 16/24 705/44 |
| 2013/0127591 A1* | 5/2013 | Shay | G07C 9/28 340/5.52 |
| 2015/0067785 A1* | 3/2015 | Donnellan | H04W 12/06 726/4 |
| 2015/0221151 A1* | 8/2015 | Bacco | G06K 9/00288 340/5.83 |
| 2015/0227727 A1* | 8/2015 | Grigg | G06F 21/31 726/4 |
| 2015/0278810 A1* | 10/2015 | Ramatchandirane | G06Q 20/401 705/16 |
| 2015/0358777 A1* | 12/2015 | Gupta | H04W 4/023 370/254 |

(Continued)

Primary Examiner — Harris C Wang
(74) Attorney, Agent, or Firm — FisherBroyles, LLP

(57) ABSTRACT

The disclosed computer-implemented method for validating a user's physical location may include (i) identifying a plurality of sensor-equipped devices that are connected to a local network, wherein the local network is associated with a physical location, (ii) receiving a request to validate that a user is present at the physical location that is associated with the local network, (iii) instructing, in response to receiving the request, the user to interact with at least one sensor-equipped device in the plurality of sensor-equipped devices, (iv) confirming, based on observing a response of the sensor-equipped device, that the user has interacted with the at least one sensor-equipped device, and (v) validating, in response to confirming that the user has interacted with the at least one sensor-equipped device, that the user is present at the physical location. Various other methods, systems, and computer-readable media are also disclosed.

20 Claims, 8 Drawing Sheets

(56) References Cited

U.S. PATENT DOCUMENTS

| | | | |
|---|---|---|---|
| 2016/0035163 A1* | 2/2016 | Conrad | G01S 5/0027 340/5.61 |
| 2016/0132031 A1* | 5/2016 | Kozura | H04L 12/2816 700/275 |
| 2016/0295364 A1* | 10/2016 | Zakaria | H04L 67/12 |
| 2016/0357525 A1* | 12/2016 | Wee | G06F 9/455 |
| 2017/0017214 A1* | 1/2017 | O'Keeffe | G05B 15/02 |
| 2017/0255314 A1* | 9/2017 | Choi | G06F 3/165 |
| 2017/0286199 A1* | 10/2017 | Soini | G06F 9/44 |
| 2020/0169549 A1* | 5/2020 | Smith | H04L 63/101 |

* cited by examiner

SYSTEMS AND METHODS FOR VALIDATING A USER'S PHYSICAL LOCATION

BACKGROUND

As an increasing volume of business is conducted remotely, such as over the Internet, verifying information provided by a party has similarly grown in importance. Some businesses, such as the ride-hailing service LYFT and the food delivery service DOORDASH rely on knowing a customer's actual physical location. Users may frequently request these services to their home address. Various secure services such as banks and government benefit programs leverage a user's home address as proof of identity. Similarly, a user's home address may be connected to other information about the user, such as through a DEPARTMENT OF MOTOR VEHICLES (DMV) record or other official record.

Unfortunately, malicious parties may attempt to provide fraudulent information or otherwise spoof their location to these businesses and services. For example, someone attempting to disrupt a food delivery service may place a large volume of fraudulent orders to various home addresses. As an additional example, a malicious individual may attempt to gain unauthorized access to an individual's credit information as part of an identity theft operation, providing the individual's home address as a factor in authenticating the unauthorized access.

These problems may be addressed by proving that the individual requesting the service or access is physically present at the address or physical location that they claim to be at, as an attacker is unlikely to be situated in the same physical location as their victim. The instant disclosure, therefore, identifies and addresses a need for systems and methods for validating a user's physical location.

SUMMARY

As will be described in greater detail below, the instant disclosure describes various systems and methods for validating a user's physical location. In one example, a computer-implemented method for validating a user's physical location may include (i) identifying a group of sensor-equipped devices that are connected to a local network, wherein the local network is associated with a physical location, (ii) receiving a request to validate that a user is present at the physical location that is associated with the local network, (iii) instructing, in response to receiving the request, the user to interact with at least one sensor-equipped device in the group of sensor-equipped devices, (iv) confirming, based on observing a response of the sensor-equipped device, that the user has interacted with at least one sensor-equipped device, and (v) validating, in response to confirming that the user has interacted with the sensor-equipped device, that the user is present at the physical location.

The above-described steps may include performing various actions once the user's physical location has been validated. In some examples, validating that the user is present at the physical location may include providing evidence that the user is present at the physical location to a multiple-factor authentication system. Additionally or alternatively, the computer-implemented method may further include enabling, based on validating that the user is present at the physical location, a transaction that requires the user to be present at the physical location. Moreover, the computer-implemented method may optionally include determining, based on validating that the user is present at the physical location, that the user lives at the physical location of the local network.

In some embodiments, the computer-implemented method may further include verifying the physical location of the local network. For example, verifying the physical location of the local network may include receiving information describing the physical location of the local network from a service provider to the local network.

In some examples, observing the response of at least one sensor-equipped device may include observing network traffic on the local network that originates from at least one sensor-equipped device and occurs in response to the user interacting with the sensor-equipped device.

In some embodiments, confirming that the user has interacted with the sensor-equipped device may include querying a remote backend service for recent interactions involving the sensor-equipped device. In these embodiments, the remote backend service maintains a log of actions performed by the sensor-equipped device. The method may additionally or alternatively include receiving information through an application programming interface (API). In some examples, observing the response of the sensor-equipped device may include receiving information from the sensor-equipped device through an API of the sensor-equipped device.

The method may identify sensor-equipped devices in a variety of ways. In some examples, identifying the group of sensor-equipped devices may include performing a device discovery operation on the local network that detects sensor-equipped devices that are connected to the local network. Additionally or alternatively, identifying the sensor-equipped devices may include receiving a list of sensor-equipped devices from a smart home management application.

In one embodiment, a system for implementing the above-described method may include (i) an identification module, stored in a memory of the system, that identifies a group of sensor-equipped devices that are connected to a local network, wherein the local network is associated with a physical location, (ii) a reception module, stored in the memory, that receives a request to validate that a user is present at the physical location that is associated with the local network, (iii) an instruction module, stored in the memory, that instructs, in response to receiving the request, the user to interact with at least one sensor-equipped device in the sensor-equipped devices, (iv) a confirmation module, stored in the memory, that confirms, based on observing a response of the sensor-equipped device, that the user has interacted with the sensor-equipped device, (v) a validation module, stored in the memory, that validates, in response to confirming that the user has interacted with the sensor-equipped device, that the user is present at the physical location, and (vi) at least one physical processor configured to execute the identification module, the reception module, the instruction module, the confirmation module, and the validation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a group of sensor-equipped devices that are connected to a local network, wherein the local network is associated with a physical location, (ii) receive a request to validate that a user is present at the physical location that is associated with the local network, (iii) instruct, in response to receiving the request, the user to interact with at least one sensor-equipped device in the group of sensor-equipped devices, (iv) confirm, based on observing a response of the sensor-equipped device, that the user has interacted with the sensor-equipped device, and (v) validate, in response to confirming that the user has interacted with the sensor-equipped device, that the user is present at the physical location.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
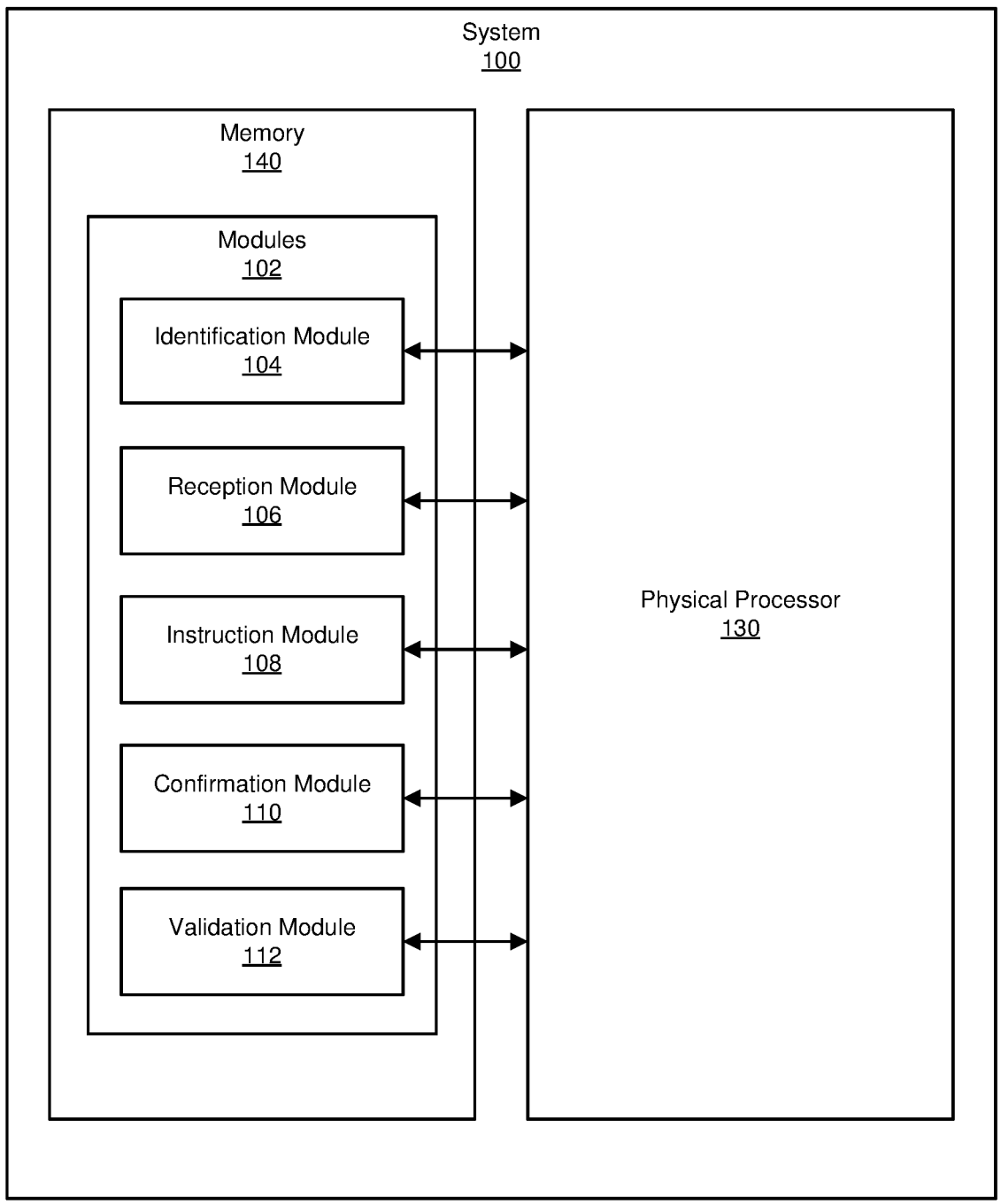
FIG. 1 is a block diagram of an example system for validating a user's physical location.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for validating a user's physical location. As will be described in greater detail below, the systems and methods described herein may validate a user's access to, presence within, control over, and/or ownership of a physical location based on confirming that the user is able to interact with various devices within a building. For example, a user's home may incorporate a number of smart devices. The user may prove that they are able to access the interior of the home by interacting with the devices. This proof of location may be used in a variety of ways, including verifying the user's location for services such as deliveries.

The systems and methods described herein may improve the field of electronic commerce by verifying information supplied by the user. Verifying a user's location in this way may prevent malicious entities from conducting fraudulent transactions that might otherwise waste a service provider's time and/or other resources. For example, ride-hailing services such as LYFT may require users to validate their physical location before LYFT will dispatch a driver to the user's location.

The systems and methods described herein may also improve the field of digital security by allowing a user's physical location to serve as a factor in multi-factor authentication schemes. Users, organizations, and/or service providers may be able to restrict access to certain systems and/or services to specific locations, and individuals who wish to access those systems and/or services may be required to demonstrate that they are physically present at the correct location. In addition, the systems and methods described herein may serve to validate location information provided by users. For example, a user may claim to live at a certain address in order to claim, e.g., government benefits and/or register to vote. The registration system may, by using the systems and methods described herein, be able to verify that the user is physically able to enter the building that they describe as their home address.

Figure 2:
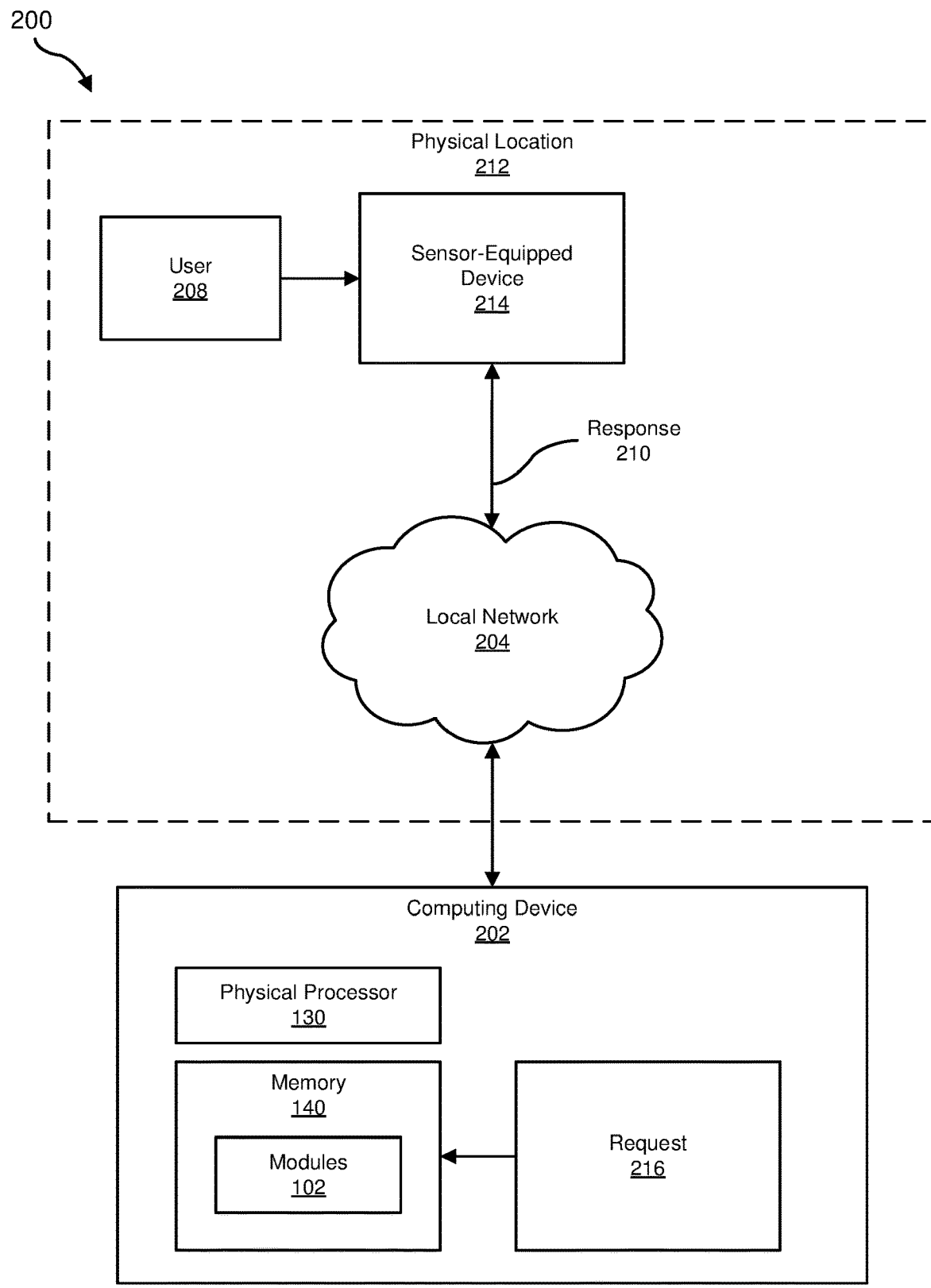
FIG. 2 is a block diagram of an additional example system for validating a user's physical location.

The following will provide, with reference to FIGS. 1-2, detailed descriptions of example systems for validating a user's physical location. Detailed descriptions of corresponding computer-implemented methods will also be provided in connection with FIG. 3. Detailed descriptions of example systems involving multiple sensor-equipped devices will be provided in connection with FIG. 4, and detailed descriptions of example systems involving remote authentication systems and/or backend systems that support sensor-equipped devices will be provided in connection with FIG. 5. Furthermore, detailed descriptions of an example process flow for validating a user's physical location will be provided in connection with FIG. 6. In addition, detailed descriptions of an example computing system and network architecture capable of implementing one or more of the embodiments described herein will be provided in connection with FIGS. 7 and 8, respectively.

FIG. 1 is a block diagram of example system 100 for validating a user's physical location. As illustrated in this figure, example system 100 may include one or more modules 102 for performing one or more tasks. For example, and as will be explained in greater detail below, example system 100 may include an identification module 104 that identifies a plurality of sensor-equipped devices that are connected to a local network, wherein the local network is associated with a physical location. Example system 100 may additionally include a reception module 106 that receives a request to validate that a user is present at the physical location that is associated with the local network. Example system 100 may also include an instruction module 108 that instructs, in response to receiving the request, the user to interact with at least one sensor-equipped device in the plurality of sensor-equipped devices. Example system 100 may additionally include a confirmation module 110 that confirms, based on observing a response of the sensor-equipped device, that the user has interacted with the sensor-equipped device. Example system 100 may also include a validation module 112 that validates, in response to confirming that the user has interacted with the sensor-equipped device, that the user is present at the physical location. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate validating a user's physical location. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202, enable computing device 202 to verify that a user is physically present at a particular location. For example, and as will be described in greater detail below, identification module 104 may identify a set of sensor-equipped devices that are connected to a local network 204. Local network 204 may be associated with a physical location 212. Reception module 106 may receive a request 216 to validate that a user 208 is present at physical location 212. Instruction module 108 may instruct, in response to receiving request 216, user 208 to interact with at least one sensor-equipped device selected from the identified set of sensor-equipped devices, such as sensor-equipped device 214. Confirmation module 110 may confirm, based on observing a response of sensor-equipped device 214, that user 208 has interacted with the sensor-equipped device 214. Validation module 112 may validate, in response to confirming that user 208 has interacted with sensor-equipped device 214, that user 208 is present at physical location 212.

Computing device 202 generally represents any type or form of computing device capable of reading computer-executable instructions and interacting with other devices over a network. In certain embodiments, computing device 202 may represent a specialized home router. In further embodiments, computing device 202 may represent a server maintained by a company or organization that provides cloud-based security services to clients. Additional examples of computing device 202 include, without limitation, desktops, servers, cellular phones, variations or combinations of one or more of the same, and/or any other suitable computing device.

Local network 204 represents any medium or architecture capable of facilitating communication or data transfer within a particular region. In general, local network 204 represents networks designed to provide connectivity to endpoint devices operating within a relatively limited physical space, such as laptops and/or mobile devices operating within a user's home or a suite in an office building. In one example, local network 204 may facilitate communication between computing device 202 and sensor-equipped device 214. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), Power Line Communications (PLC), portions of one or more of the same, variations or combinations of one or more of the same, and/or any other suitable network.

Local network 204 may connect to a wider network, such as the Internet, through an intermediary service, such as an internet service provider (ISP). The intermediary service may retain information that describes the physical location of local network 204. For example, an ISP may register a router/modem as being located at a particular street address. Local networks, such as Wi-Fi networks and LANs, connected to the router/modem may likewise be associated with that particular street address by virtue of representing sub-networks connected to the Internet via the home router. Given that local network 204 generally represents a network that serves a limited region of physical space, users that are able to access local network 204 and/or interact with devices connected to local network 204 may be presumed to be present at the same physical location as local network 204 (i.e., physical location 212).

Physical location 212 generally represents an identifiable region of physical space served by local network 204. For example, local network 204 may represent a home network. In this example, physical location 212 may represent the street address of the building served by the home network. As an additional example, local network 204 may represent a wireless network that serves a particular suite of an office building. In this example, physical location 212 may represent the suite of the office building.

Sensor-equipped device 214 generally represents any sort of electronic device, appliance, or apparatus connected to local network 204 that is capable of sensing actions taken by a user. Sensor-equipped device 214 may report these actions (e.g., as response 210) directly and/or indirectly to a backend service, device-management application, or other suitable target over local network 204. In some examples, sensor-equipped device 214 may be connected to another device configured to execute software that reports to the backend service, device-management service, or other target. Examples of sensor-equipped device 214 include, without limitation, network-enabled cameras, smart appliances such as smart refrigerators and/or smart toasters, internet-enabled vehicles, game console peripherals such as XBOX KINECT, smart devices such as a NEST, security systems, purpose-built devices, other smart home devices such as an AMAZON ALEXA, and/or any other device connected to a local network that is capable of sensing and reporting user activity.

In some embodiments, sensor-equipped devices may be Internet of Things (IoT) devices. In general, IoT devices are network-enabled devices that may be monitored and/or managed through a remote application, such as a smart phone application. Examples of IoT devices include, without limitation, smart thermostats, smart lighting systems, smart locks, network-enabled cameras (e.g., DROPCAM), internet-enabled baby monitors, and the like.

Request 216 generally represents any type or form of request to verify that a user is physical present at physical location 212. Request 216 may be issued by an autonomous software system and/or authentication system (e.g., authentication system 506 in FIG. 5) to prevent fraudulent activity, unauthorized access to resources, and/or any other undesirable activity that may be mitigated or prevented by requiring a user to validate their physical location. For example, a user attempting to register a new device to a home network might be required to first prove that they are able to enter the home and interact with devices within the home, thereby securing the home network against malicious individuals attempting to use the home network for nefarious purposes. As an additional example, a commercial ride-hailing service, such as LYFT, may require users to verify that they are physically present at a requested pickup point to avoid fraud that might otherwise waste drivers' time. As a further example, a secure online service, such as a Social Security management service, may request proof that a user is physically present at the location reported to be their home address as a security measure to protect against fraudulent activity.

Figure 3:
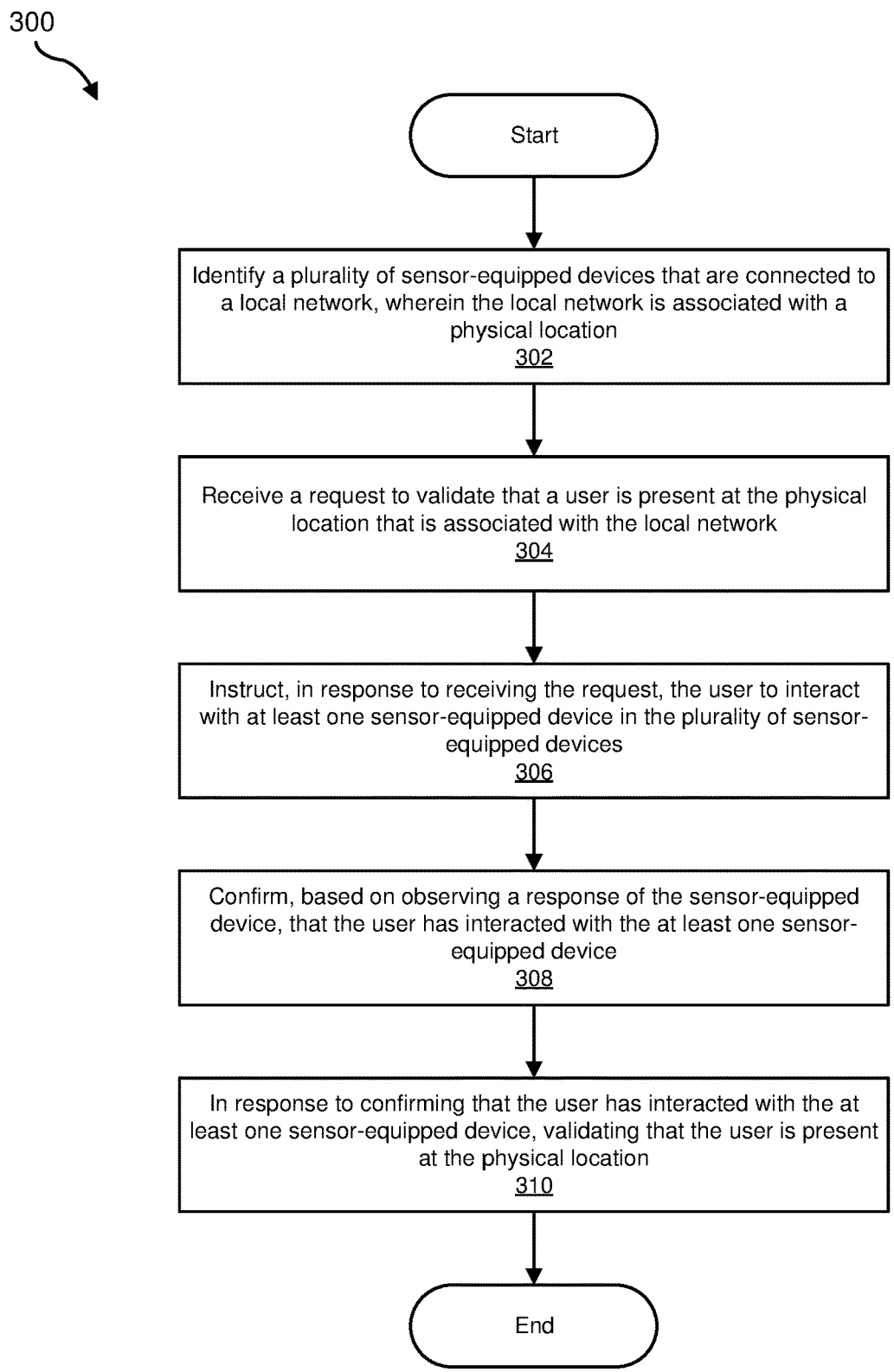
FIG. 3 is a flow diagram of an example method for validating a user's physical location.

FIG. 3 is a flow diagram of an example computer-implemented method 300 for validating a user's physical location. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a plurality of sensor-equipped devices that are connected to a local network, wherein the local network is associated with a physical location. For example, identification module 104 may, as part of computing device 202 in FIG. 2, identify sensor-equipped device 214 that is connected to local network 204, wherein local network 204 is associated with physical location 212.

Identification module 104 may identify sensor-equipped devices in a variety of ways. In some embodiments, identification module 104 may identify sensor-equipped devices, including sensor-equipped device 214, by performing a device discovery operation on local network 204 that detects devices connected to local network 204. This device discovery operation may return information and/or metadata that describes devices connected to local network 204. For example, a device discovery operation may provide identification module 104 with information describing the device type, manufacturer, software versions, hardware versions, name, etc. of each device connected to local network 204. As a specific example, identification module 104 may execute a LINK LAYER DISCOVERY PROTOCOL.

Identification module 104 may then filter the list of discovered devices to generate a list of sensor-equipped devices for use by other elements of modules 102. Identification module 104 may be aware of certain elements of information, such as device names, that correspond to sensor-equipped devices (e.g., AMAZON ALEXA). Identification module 104 may then add each device with a device name that is known to correspond to a sensor-equipped device to a list of sensor-equipped devices.

Furthermore, identification module 104 may associate sensor-equipped devices with metadata that describes ways in which a user can interact with each sensor-equipped device. For example, a smart thermostat may be associated with metadata that indicates that users can be instructed to adjust the temperature on the thermostat. Similarly, a door position sensor may be associated with metadata that indicates that users can be instructed to open and/or close the door. Identification module 104 may store this information with in the above-described database.

In some embodiments, the database may be stored remotely. Such a remote database may process and store information received from a variety of sources. For example, the database may process and store device information received from identification module 104. The database may also process and store device information received from different instances of the systems and methods described herein that each execute on separate, geographically distinct local networks. This distributed acquisition of device information may enable new instances of modules 102 to efficiently begin identifying local devices without requiring lengthy analysis or end-user intervention. As an example embodiment incorporating a remote database, a security vendor may incorporate the systems and methods described herein as part of an identify-verification suite. The security vendor may maintain a database of known sensor-equipped devices and permit software executing on client systems to access the database on a subscription basis. Other elements of modules 102 may reference this database when instructing a user to interact with sensor-equipped devices, as will be described in greater detail below. Additionally or alternatively, the database may be stored locally (i.e., on a device connected to local network 204, such as computing device 202 in FIG. 2 and/or gateway 502 in FIG. 5). The local database may be a copy of a remote database and/or populated by direct observations from one or more of modules 102.

In further embodiments, identification module 104 may identify the plurality of sensor-equipped devices by receiving a list of sensor-equipped devices from a smart home management application. In some examples, such a smart home management application may execute on purpose-built hardware, such as a smart-home router (e.g., NORTON CORE), that assists users in managing IoT devices. Each of these devices may be registered to a database maintained by the smart home management application. Identification module 104 may accordingly be able to request, receive, or otherwise access a list of devices registered to the database. As described above, identification module 104 may filter this list according to certain criteria to ensure that appropriate devices are selected for use by other elements of modules 102. For example, identification module 104 may filter out devices that are located outside the home. As a specific example, an exterior-facing DROPCAM may be excluded from the list of sensor-equipped devices because a malicious individual outside the home may be able to access the exterior facing DROPCAM. Conversely, a DROPCAM that shows the interior of a hallway may be added to the list as only users with access to the interior of the building will be able to interact with the camera.

Moreover, in some examples identification module 104 may assign trust values to each identified sensor-equipped device. Devices produced by trusted manufacturers, devices that generate difficult-to-spoof data (e.g., by cryptographically signing communications transmitted by the device), devices that are fixed in place rather than portable, etc., may be assigned higher trust values than devices that do not meet these criteria. The trust value assigned to a particular sensor-equipped device may be used by other elements of modules 102 for a variety of purposes, as will be described in greater detail below. Moreover, the trust values assigned to devices may be determined based on a combination of factors. For example, a microphone-enabled device that is mounted to an interior wall of a home and cryptographically signs transmissions using a Trusted Platform Module (TPM) may be assigned a trust value that indicates a high level of trustworthiness, whereas a portable network-enabled camera that is known to have critical security flaws in its software may be assigned a trust value that indicates a low level of trustworthiness.

Figure 4:
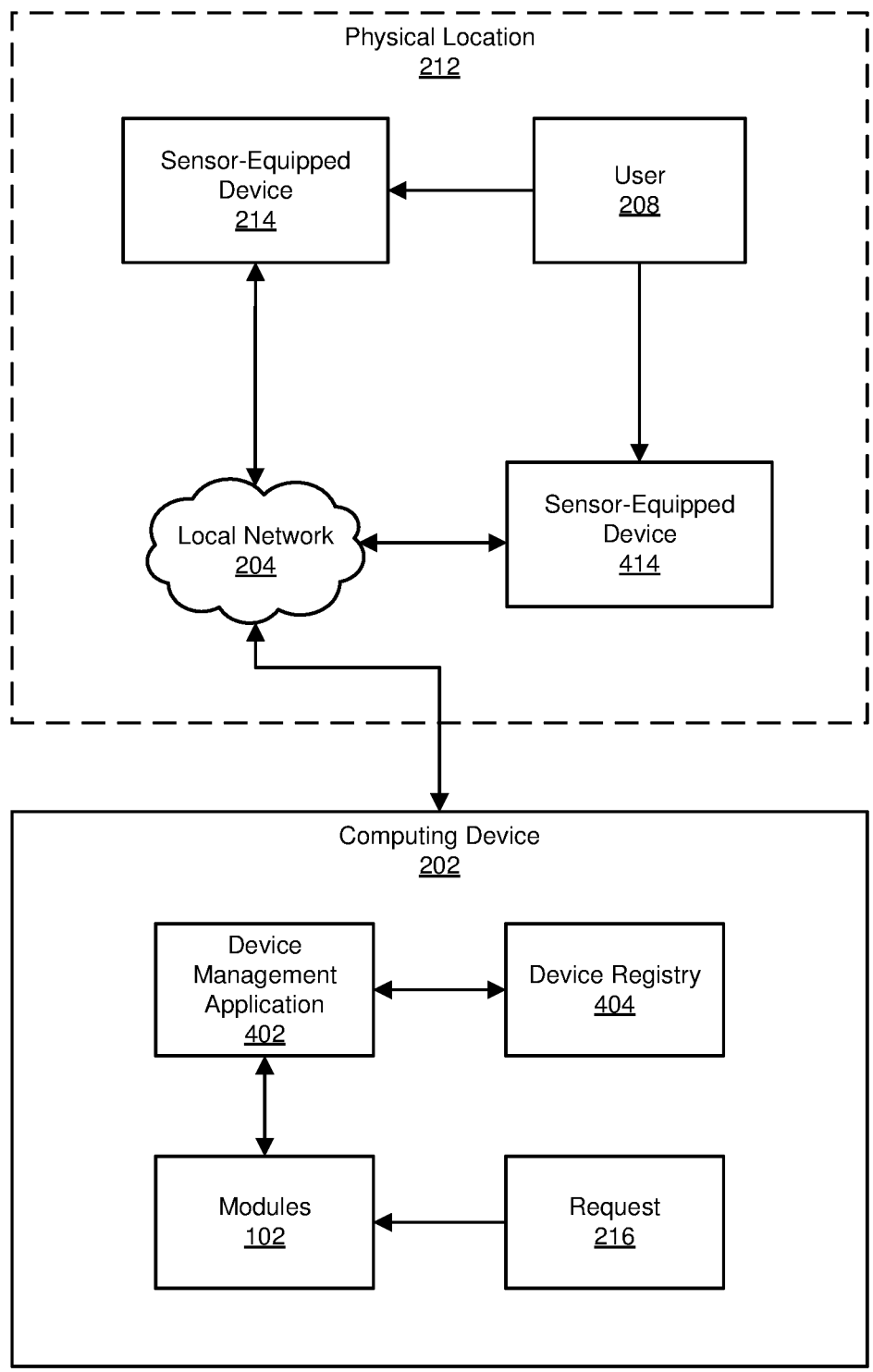
FIG. 4 is a block diagram of an example computing system for validating a user's physical location using multiple sensor-equipped devices.

An illustrated example of a location verification system that involves multiple sensor-equipped devices is provided in FIG. 4. In this example, identification module 104 may execute on computing device 202 that is connected to local network 204. Identification module 104 may interface with a device management application 402 that assists user 208 in managing various network-enabled devices throughout their home. Device management application 402 may maintain a device registry 404 of network-enabled devices connected to local network 204 in addition to other information about those devices, such as the role of the device, capabilities of the device, etc. Identification module 104 may query device management application 402 to obtain a list of sensor-equipped devices within physical location 212 and thereby identify sensor-equipped devices 214 and 414. Identification module 104 may additionally or alternatively use any of the above-described methods for identifying sensor-equipped devices on a network.

Returning to FIG. 3 at step 304, one or more of the systems described herein may receive a request to validate that a user is present at the physical location that is associated with the local network. For example, reception module 106 may, as part of computing device 202 in FIG. 2, receive request 216 to validate that user 208 is present at physical location 212.

Reception module 106 may execute as part of various systems. In some embodiments, reception module 106 may execute on a local device such as a home router or gateway device. In these examples, the device that executes reception module 106 may be connected to local network 204 and, by extension, any other networks that are connected to local network 204. For example, a router connected to local network 204 may also be connected to the Internet by way of local network 204. In further embodiments, reception module 106, along with other elements of modules 102, may execute on a cloud server or other backend device that manages clients' IoT devices and/or networks. In these examples, the device that executes reception module 106 may be connected to local network 204 via the Internet. Moreover, the cloud server or other backend device may be able to access and/or receive information about devices connected directly to local network 204 through various software installed on management devices, personal devices such as a user's mobile phone, the sensor-equipped devices themselves, etc.

Regardless of where reception module 106 executes, reception module 106 may receive request 216 in any of a variety of contexts. In some embodiments, reception module 106 may receive request 216 from a system outside of local network 204. For example, reception module 106 may receive request 216 from a backend security system managed by an organization that provides location validation of clients to various service providers. As a specific example of this embodiment, a pizza delivery shop may subscribe to a customer location verification service. When the pizza delivery shop receives an online order to a customer's home (i.e., physical location 212), the shop may trigger a request through the subscription service to verify that the customer is indeed present at physical location 212. A backend server of the subscription service may then transmit request 216 to a home router that manages local network 204 and executes reception module 106.

Figure 5:
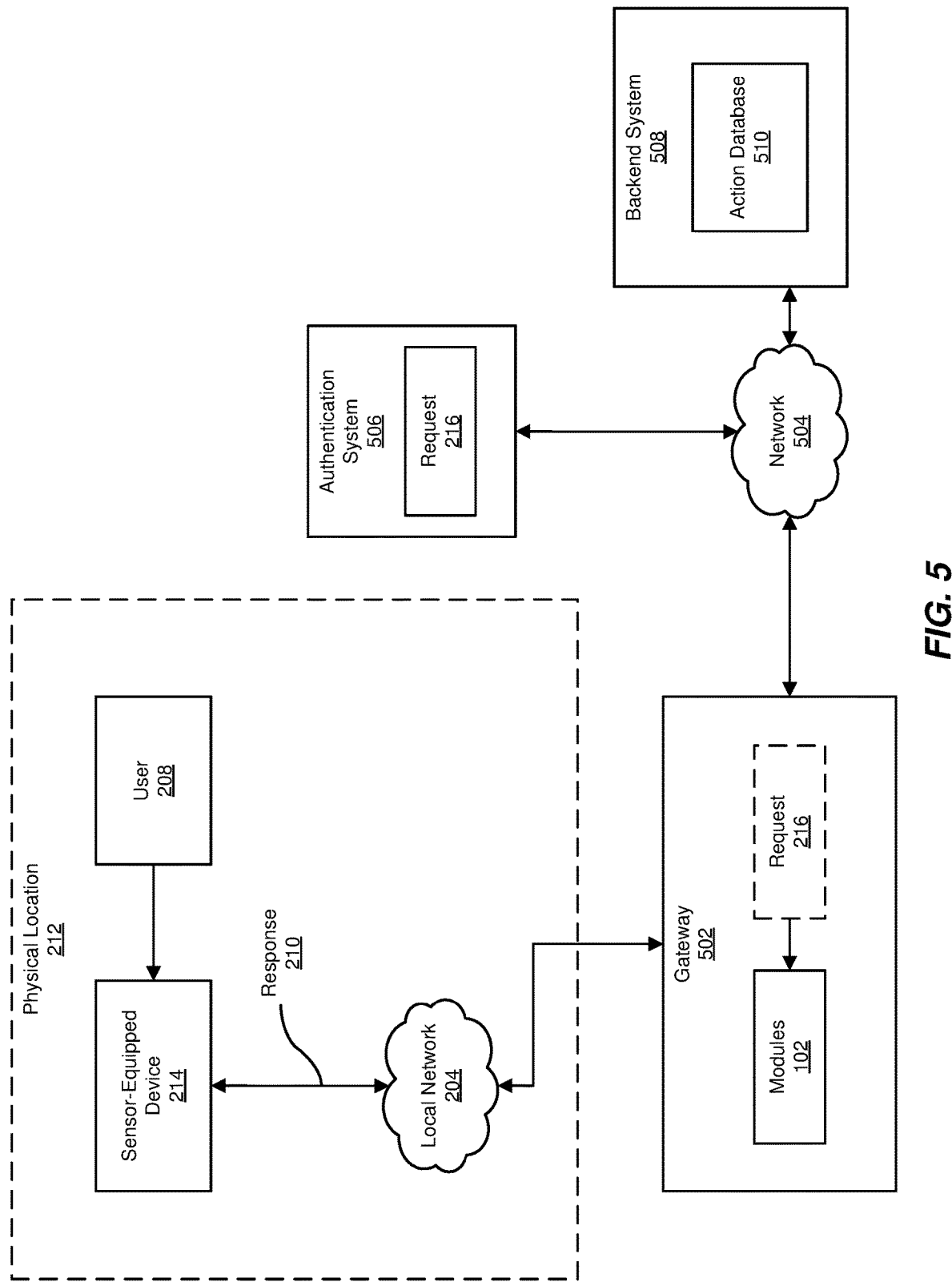
FIG. 5 is a block diagram of an example computing system for validating a user's physical location that queries a backend service of a sensor-equipped device.

An example embodiment in which reception module 106 receives request 216 from a system external to local network 204 is illustrated in FIG. 5. As shown in FIG. 5, user 208 may be attempting to validate their physical location with authentication system 506. Authentication system 506 may, as part of this validation process, issue request 216 to an instance of reception module 106 that execute on a gateway 502. In this example, gateway 502 serves as an interface between local network 204 and network 504. Other elements of modules 102 may then act based on information received as part of request 216.

In further embodiments, reception module 106 may receive request 216 from a device connected to local network 204. For example, a wireless access point that enables a home network (i.e., local network 204) may detect that a new device is attempting to connect to local network 204. The wireless access point may then issue request 216 to reception module 216 to ensure that the owner of the new device is a legitimate user. By contrast, a malicious individual who is physically located outside the home attempting to gain illegitimate access to local network 204 may be unable to fulfill the validation requirements, as will be described in greater detail below.

Reception module 106 may also take a variety of additional actions as part of receiving and processing request 216 to ensure that the systems and methods described herein are able to properly validate a user's physical location, such as verifying the physical location of local network 204. Reception module 108 may verify the physical location of network 204 in a variety of ways. For example, reception module 108 may receive geolocation information from hardware connected to local network 204 (e.g., a secure router/modem) that (a) is able to acquire geolocation information such as through the Global Positioning System (GPS) and (b) provide proof that the geolocation information is authentic, such as by digitally signing the geolocation information with a Trusted Platform Module (TPM). Reception module 108 may then correlate this geolocation information with other forms of location information, such as translating geolocation coordinates into a street address.

Additionally or alternatively, reception module 106 may receive information about local network 204 from a service provider to local network 204. For example, reception module 106 may receive information describing the physical location of local network 204 from an Internet Service Provider (ISP) that provides service to local network 204. ISPs are, as part of routine network operations, generally aware of the physical locations of modems that connect to their networks. For example, the service provider COMCAST is aware of the street addresses of each modem that connects to the Internet through the XFINITY service. Reception module 106 may identify unique information of hardware, such as the above-described modem, connected to local network 204 such as Media Access Control (MAC) addresses, serial numbers, externally visible IP addresses, combinations of one or more of the same, and/or any other suitable information that uniquely identifies a device connected to local network 204.

Reception module 106 may then provide this uniquely identifying information to the ISP or other service provider and receive location information describing the physical location of that device. For example, reception module 106 may provide an ISP with a MAC address and serial number of a modem that hosts local network 204. The ISP may, in return, provide reception module with location information that reception module 106 may then use to verify the physical location of local network 204. Conversely, reception module 106 may provide the purported physical location of local network 204 to a service provider and in return receive information that uniquely identifies hardware connected to local network 204. By matching unique identifiers of hardware associated with local network 204 to the physical location of local network 204 in this manner, reception module 106 may thereby prevent malicious entities from spoofing the physical location of a network. Once reception module 106 has processed request 216, other elements of modules 102 may instruct the relevant user to interact with devices connected to local network 204.

At step 306 in FIG. 3, one or more of the systems described herein may instruct, in response to receiving the request, the user to interact with at least one sensor-equipped device in the plurality of sensor-equipped devices. For example, instruction module 108 may, as part of computing device 202 in FIG. 2, instruct, in response to receiving request 216, user 208 to interact with sensor-equipped device 214.

Instruction module 108 may instruct user 208 to interact with sensor-equipped device 214 in a variety of ways. In general, instruction module 108 may communicate with user 208 via a user interface. Examples of such a user interface include, without limitation, displays on the screen of a computing device and/or audio feedback interfaces.

Instruction module 108 may select sensor-equipped device 214 based on a variety of factors. For example, instruction module 108 may automatically select sensor-equipped device 214 based on how difficult it would be to spoof an interaction between user 208 and sensor-equipped device 214. In other words, instruction module 108 may select sensor-equipped devices and tasks for user 208 to accomplish such that completion of those tasks satisfies a threshold level of certainty that user 208 is present at physical location 212. As a specific example, other elements of modules 102 may have identified a number of sensor-equipped devices connected to local network 204, including an AMAZON ALEXA device and a DROPCAM home security camera. Users generally keep AMAZON ALEXA devices inside their homes, whereas a DROPCAM may be located on the exterior of the building. Accordingly, instruction module 108 may determine that user interactions with the AMAZON ALEXA device may be more difficult for an attacker to spoof, as such interactions may require the user to be physically present within the interior of the home.

Additionally or alternatively, instruction module 108 may consider other factors, such as if the interaction can be verified with a trusted third party. For example, user interactions with an AMAZON ALEXA device may be verified by backend services managed by AMAZON, whereas interactions with other home devices may not be able to be verified in this manner. This third-party verification process will be described in greater detail below.

Any or all of the above factors may be based on information stored within a database, such as the database of sensor-equipped devices described above in connection with identification module 104. Instruction module 108 may access entries stored within the database that correspond to sensor-equipped devices discovered to be connected to local network 204, and use the metadata associated with those entries to determine how difficult it would be for an attacker to spoof an interaction with a particular device, whether interactions with the device can be verified with a third party, ways in which devices respond to user interactions, etc. As a specific example of an entry within this database, the database may include an entry for AMAZON ALEXA devices indicating that AMAZON ALEXA devices are capable of detecting sound and processing that sound into text, that it is moderately difficult to spoof an interaction, that the AMAZON ALEXA device will communicate with an AMAZON backend server in response to a user interaction, and that interactions with an AMAZON ALEXA can be verified with the backend server.

Instruction module 108 may combine these factors into a trust score and use the combined trust score to determine whether to instruct user 208 to interact with a particular sensor-equipped device. In some examples, instruction module 108 may prioritize instructing users to interact with trusted sensor-equipped devices over interacting with less-trusted sensor-equipped devices. Returning to the above comparison between an AMAZON ALEXA device and a DROPCAM, instruction module 108 may consider that interactions with the AMAZON ALEXA are more difficult to spoof and can be verified by a third party, whereas an individual outside the building might be able to trigger an interaction with a DROPCAM and the DROPCAM interactions may be unable to be verified by a third party. Instruction module 108 may accordingly prioritize the AMAZON ALEXA when selecting sensor-equipped devices to be used in the verification process. In some embodiments, instruction module 108 may pre-calculate the trust score. Instruction module 108 may store the pre-calculated trust score in a database, such as the above-described database of devices, and/or in an additional database that stores trust scores associated with given arrangements of sensor-equipped devices. For example, the above-described database of devices may associate each individual device with a pre-calculated trust score. As an additional example, the additional database may contain an entry detailing a trust score for a task set including particular devices within a user's home (e.g., a trust score associated with a task set that includes interacting with a smart lightbulb, smart refrigerator, and an AMAZON ALEXA).

Furthermore, instruction module 108 may instruct user 208 to interact with multiple sensor-equipped devices. In general, interactions with a greater number of sensor-equipped devices may be more difficult to spoof than interactions with just a single sensor-equipped device. Instruction module 108 may also balance security (e.g., by increasing the number of devices that user 208 must properly interact with) and convenience (e.g., by selecting tasks that are less complex and/or time consuming over tasks that are more complex and/or time consuming). Instruction module 108 may balance security and convenience by selecting the minimum number of devices that user 208 must interact with that will satisfy a certainty threshold. In other words, instruction module 108 may select tasks that are sufficiently complex and/or trusted enough to meet a confidence threshold that completion of the tasks accurately proves that user 208 is present within physical location 212, that user 208 controls physical location 212, and/or that user 208 is in possession of physical location 212.

In some embodiments, instruction module 108 may permit user 208 to select a sensor-equipped device or group of sensor-equipped devices to interact with. For example, instruction module 108 may present user 208 with a curated list of sensor-equipped devices connected to local network 204. Instruction module 108 may curate the list such that each selection on the list includes sensor-equipped devices whose activation would be sufficient to prove that user 208 is physically present at physical location 212. Additionally or alternatively, instruction module 108 may instruct user 208 to select multiple sensor-equipped devices from the curated list.

Moreover, instruction module 108 may instruct user 208 to perform a variety of tasks depending on which sensor-equipped devices are selected for interaction. For example, instruction module 108 may instruct user 208 to perform actions appropriate to the devices selected. Some specific examples of tasks that instruction module 108 may instruct user 208 to perform include, without limitation, adjusting the temperature of a smart thermostat, switch on a particular device, open or close a specific door, trigger a motion sensor, enter a specific room of the house, speak a particular phrase to an AMAZON ALEXA device, etc. Once user 208 has selected sensor-equipped devices to interact with and/or been instructed to interact with particular sensor-equipped devices, the systems and methods described herein may monitor local network 204 for evidence that user 208 has indeed interacted with the designated devices.

Instruction module 108 may generate the instructions for user 208 based on information stored within a database. As described above, a database may include entries for various types and/or forms of sensor-equipped device in association with metadata describing various properties of that sensor-equipped device, such as sensing capabilities of the sensor-equipped device. Instruction module 108 may retrieve this information and generate instructions based on the capabilities of each device that has been selected for use in the validation process. For example, identification module 104 may identify a sensor-equipped refrigerator and an AMAZON ALEXA device connected to a user's home network. Instruction module 108 may search the database for entries corresponding to the refrigerator and AMAZON ALEXA device and determine that the refrigerator is capable of reporting when it has been opened, and that the AMAZON ALEXA device is capable of detecting user speech. Instruction module 108 may then generate instructions based on this information, such as instructions that direct user 208 to open the refrigerator and then speak a particular pass phrase to the AMAZON ALEXA device.

At step 308, one or more of the systems described herein may confirm, based on observing a response of the sensor-equipped device, that the user has interacted with the sensor-equipped device. For example, confirmation module 110 may, as part of computing device 202 in FIG. 2, confirm, based on observing a response of sensor-equipped device 214, that user 208 has interacted with sensor-equipped device 214.

Confirmation module 110 may confirm that user 208 has correctly interacted with sensor-equipped device 214 in a variety of ways. In some examples, confirmation module 110 may receive information from instruction module 108 detailing the completion conditions for each task. For example, instruction module 108 may provide confirmation module 110 with information describing an expected response of a sensor-equipped device to a user interaction. As a specific example, instruction module 110 may provide information to confirmation module 110 indicating that a user has correctly interacted with an AMAZON ALEXA device with confirmation module 110 detects that the AMAZON ALEXA device has initiated an Internet connection to a remote server. Other examples of completion criteria will be provided in greater detail below.

In some embodiments, confirmation module 110 may monitor local network 204 and observe network traffic originating from sensor-equipped device 214 that occurs in response to user 208 interacting with sensor-equipped device 214. Even if this network traffic is encrypted or otherwise opaque to confirmation module 110, the presence of the network traffic may be sufficient to indicate that sensor-equipped device 214 has been activated. For example, instruction module 108 may have instructed a user to activate an AMAZON ALEXA device. The AMAZON ALEXA device may then engage in network communications as part of processing that activation. Confirmation module 110 may observe that these network communications have taken place and be able to confirm that user 208 has correctly activated the AMAZON ALEXA device, even if confirmation module 110 is unable to discern the contents of the network communication. Monitoring network traffic in this manner may thereby allow confirmation module 110 to monitor sensor-equipped devices without requiring any integration with devices, preserving user privacy.

Similarly, confirmation module 110 may track the state of sensor-equipped device 214 through other devices and/or applications. For example, sensor-equipped device 214 may represent a lightbulb connected to a smart power outlet that is capable of communicating with confirmation module 110. In this example, instruction module 108 may instruct user 208 to turn on the lights in a particular room that includes the lightbulb. Confirmation module 110 may track the power consumption of the lightbulb through the smart power outlet to determine whether or not user 208 has completed the assigned task.

As described briefly above, various elements of modules 102 may verify that user 208 has interacted with sensor-equipped device 214 by querying a backend system that receives communications from sensor-equipped device 214. In some embodiments, this backend system may be a local system, such as a computing device connected to local network 204 (e.g., a local IoT management server) that manages network-enabled devices throughout a building. This local computing device may maintain a database or other record of actions performed by various sensor-equipped devices. For example, a door sensor may report when it opens or closes, and the local computing device may log when the door opens or closes. Confirmation module 110 may query the local computing device for information relevant to confirming that user 208 has interacted with sensor-equipped device 214. For example, confirmation module 110 may query the local computing device to verify that user 208 opened and closed a particular door after being instructed to do so by instruction module 108.

In further embodiments, confirmation module 110 may confirm that user 208 has interacted with sensor-equipped device 214 by querying a remote backend service for recent interactions involving sensor-equipped device 214. Such a remote backend service may maintain a log of actions performed by sensor-equipped device 214 in a manner similar to the local computing device described above, and confirmation module 110 may query this remote database when relevant. For example, instruction module 108 may instruct user 208 to speak a particular phrase to an AMAZON ALEXA device. Confirmation module 110 may confirm that this interaction has taken place by querying an AMAZON backend system for phrases recently spoken to that particular AMAZON ALEXA device. Confirmation module 110 may receive a variety of information from the remote backend system, such as metadata describing which devices were involved, when the event occurred, the nature of the interaction (e.g., a spoken phrase), and the like.

An illustrated example of confirmation module 110 interacting with a backend system is shown in FIG. 5. As shown in FIG. 5, a gateway device 502 may execute modules 102 and receive request 216 from authentication system 506. Instruction module 108 may instruct user 208 to interact with sensor-equipped device 214, and sensor-equipped device 214 may transmit response 210 over local network 204 in response to the interaction. Confirmation module 110 may detect response 210 that occurs on local network 204, but may be unable to discern whether response 210 occurred as a direct response to user 208 interacting with sensor-equipped device 214 or as part of some other network activity, such as routine signaling, undertaken by sensor-equipped device 214. Confirmation module 110 may therefore confirm whether user 208 properly interacted with sensor-equipped device 214 by querying backend system 508. Backend system 508 may, in general, maintain an action database 510 that records activity taken by sensor-equipped device 214. Action database 510 may also include actions performed by sensor-equipped device 214 that were initiated by user 208, such as user 208 speaking a specific phrase to an AMAZON ALEXA device, as described above. Backend system 508 may provide confirmation module 110 with information that can be used to confirm that user 208 has in fact interacted with sensor-equipped device 214 in the manner prescribed by instruction module 108.

In some examples, confirmation module 110 may receive information directly from a sensor-equipped device. For example, confirmation module 110 may verify the response of sensor-equipped device 214 by receiving information from sensor-equipped device 214 through an application programming interface (API) of sensor-equipped device 214. For example, a home wireless access point may be configured to provide information directly to confirmation module 110. In this example, instruction module 108 may instruct user 208 to enter a specific room of the house, and the home wireless access point may determine that the user has completed this task via, for example, wireless-signal interference tracking. The home wireless access point may then communicate directly with confirmation module 110 to confirm that user 208 has entered the correct room, thereby also confirming that user 208 is physically present at physical location 212. Similarly, an AMAZON ALEXA device may be capable of interfacing directly with a router or other computing device that executes confirmation module 110.

In embodiments where confirmation module 110 is able to receive detailed information about the nature of user 208 interacting with sensor-equipped device 214, confirmation module 110 may also confirm that user 208 has interacted with sensor-equipped device 214 in the correct fashion. Confirmation module 110 may receive this information in a variety of ways, such as by querying a backend system and/or through an API of sensor-equipped device 214, as described above. Confirmation module 110 may then check whether the information received about the nature of user 208's interactions matches with the task/tasks assigned by instruction module 108. As a specific example, instruction module 108 may instruct user 208 to speak a specific phrase to an AMAZON ALEXA device. Confirmation module 110 may then query a backend database that logs interactions with the AMAZON ALEXA device to confirm that user 208 has indeed spoken the correct phrase. Adding this additional level of verification further increases the complexity of the validation process without unduly burdening end users, thereby providing a simple mode of making such interactions with sensor-equipped devices more difficult for attackers to spoof or otherwise imitate.

In embodiments where elements of modules 102 identified and instructed user 208 to interact with multiple sensor-equipped devices, confirmation module 110 may maintain a list of designated sensor-equipped devices that the user must interact with before confirmation module 110 will confirm that the user has completed the authentication process. This list may be generated by instruction module 108 when instruction module 108 generates the set of tasks that user 208 must complete. Confirmation module 110 may remove devices from this list as user 208 properly interacts with each sensor-equipped device.

Moreover, confirmation module 110 may require that user 208 complete all assigned tasks within a predetermined length of time. Should user 208 fail to complete the tasks assigned by instruction module 108, confirmation module 110 may determine that user 208 has failed to complete the validation process and cause other elements of modules 102 to refrain from validating user 208 as being present at physical location 212.

Figure 6:
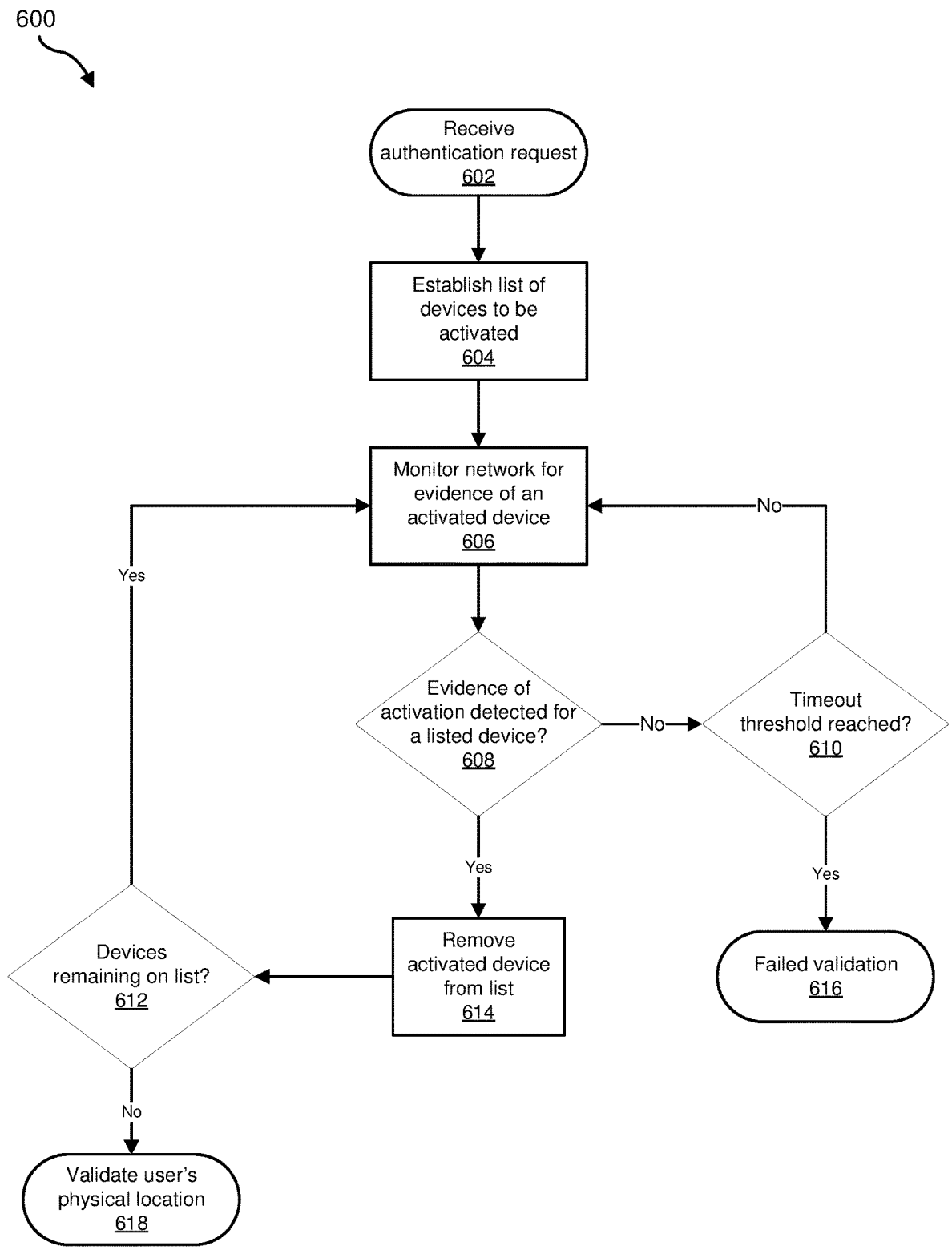
FIG. 6 is a flow diagram illustrating an example decision flow of an algorithm for validating a user's physical location.

FIG. 6 provides a flow diagram illustrating an example flow 600 for determining whether user 208 has successfully completed the validation process. At step 602 of flow 600 and as described above in connection with reception module 106, the systems and methods described herein may receive an authentication or validation request from a system that seeks to validate user 208's physical location. At step 604 and as described above in connection with instruction module 108, the systems and methods described herein may generate and/or compile a list of sensor-equipped devices that user 208 must activate within a specified time frame in order to successfully complete the validation process.

At step 606 of flow 600, confirmation module 110 may monitor local network 204 for evidence that user 208 has activated a sensor-equipped device. Additionally or alternatively, confirmation module 110 may receive information from one or more backend systems that manage a sensor-equipped device that indicates that user 208 has successfully activated a sensor-equipped device. At step 608 of flow 600, confirmation module 110 may check to see whether confirmation module 110 has detected evidence that user 208 has activated a sensor-equipped device on the list of devices established during step 604. In the event that confirmation module 110 has not detected evidence of device activation, confirmation module 110 may, at step 610, check to see whether a timeout threshold has been reached. In other words, confirmation module 110 may check to see whether the predetermined amount of time has elapsed. If the timeout threshold has been reached, confirmation module 110 proceeds to step 616 and determines that user 208 has failed the validation process.

If the timeout threshold has not been reached, confirmation module 110 may return to step 606 and monitor local network 204 for evidence that user 208 has activated a sensor-equipped device. When confirmation module 110 detects evidence that user 208 has indeed activated a sensor-equipped device, confirmation module 110 may proceed to step 614 of flow 600. At step 614 of flow 600, confirmation module 110 may remove the activated device from the list established during step 604 and proceed to step 612. At step 612, confirmation module 110 may check to see whether any devices remain on the list. If there are still devices on the list (i.e., user 208 has not yet completed every task), confirmation module 110 may return to step 606 and resume monitoring local network 204. If no devices remain on the list (indicating that user 208 has completed each task successfully), confirmation module 110 may determine that user 208 has successfully completed all assigned tasks and proceed to step 618. At step 618 of flow 600, verification module 112 may validate user 208 as being present at physical location 212, as will be described further below.

At step 310 in FIG. 3, one or more of the systems described herein may validate, in response to confirming that the user has interacted with the sensor-equipped device, that the user is present at the physical location. For example, validation module 112 may, as part of computing device 202 in FIG. 2, validate, in response to confirmation module 110 confirming that user 208 has interacted with sensor-equipped device 214, that user 208 is present at physical location 212.

Validation module 112 may perform a variety of actions as part of validating that user 208 is present at physical location 212. In some embodiments, validation module 112 may provide a validation success token to the system that issued request 216. This validation success token may be encrypted and/or digitally signed to ensure that systems that receive the validation success token are able to trust that the validation success token is authentic. For example, in embodiments where gateway 502 is so equipped (e.g., with a TPM), validation module 112 may digitally sign the success token to provide trustworthy evidence that the validation token is authentic. Additionally or alternatively, the validation success token may be encrypted using a public key provided by the system that issued request 216 (e.g., authentication system 506) to ensure that only the requesting system is able to process the token, thereby preserving user 208's privacy.

Moreover, validation module 112 may include a variety of information as part of validating that user 208 is present at physical location 212. In some embodiments, the validation may be a simple yes or no signal indicating whether or not user 208 fulfilled the assigned tasks in a reasonable amount of time.

A validation success token may be provided to a variety of systems in a variety of contexts. In some examples, validation module 112 may validate that the user is present at the physical location by providing evidence that the user is present at the physical location to a multiple-factor authentication system. For example, user 208 may have configured an e-mail inbox to only be accessible from home. User 208 may accordingly need to provide their username, password, and evidence that they are at home to the e-mail authentication system before they will be granted access to the e-mail system. While this example refers to an e-mail account, such multi-factor and/or location-restricted authentication may be applied to a variety of services, such as online benefits account access, bank account access, etc.

In further embodiments, validation module 112 may enable a transaction that requires the user to be present at the physical location. As described above, a user may request services such as a ride-hailing service or food delivery to their location. These services, in an effort to avoid responding to fraudulent requests, may require customers to validate their physical location before the service will acknowledge the request. Once confirmation module 110 confirms that user 208 has completed the tasks assigned by instruction module 108, validation module 112 may enable the requested transaction. This enabling may occur locally, e.g., as part of a script executing within a browser on a computing device used by user 208. The script, potentially delivered as part of a transaction processing system, may prevent user 208 from completing the transaction until receiving confirmation from validation module 112 that user 208 is at the location they claim to be at. Additionally or alternatively, this validation may occur remotely in a manner parallel to the remote authentication embodiments described above.

Additionally or alternatively, validation module 112 may confirm that user 208 lives at the address represented by physical location 212 of local network 204. For example, certain systems may require a user to enter a valid home address. Examples of such systems include, without limitation, government benefits websites, online employment eligibility forms, and the like. These systems may request that the systems and methods described herein validate user 208's physical location under the presumption that the street address associated with the user's home network is also likely to be the user's home address. Once user 208 has completed the validation process described above, validation module 112 may digitally sign address information on behalf of the user or otherwise inform the requesting system that the address information entered by user 208 is valid for use as user 208's home address.

As described above in connection with example method 300 in FIG. 3, various software systems may require validation of a user's physical location. A secure router or other device connected to a home network may enable these systems to leverage other devices on the network to act as sensors for proving that a user is physically present within the home. The systems and methods described herein may use any number and/or arrangement of these devices to generate a list of tasks for the user to complete within a certain amount of time. Once the user has completed these tasks, the systems and methods described herein may validate the user's physical location. This validation of the user's physical location may be used in a variety of ways, as described in greater detail above.

Figure 7:
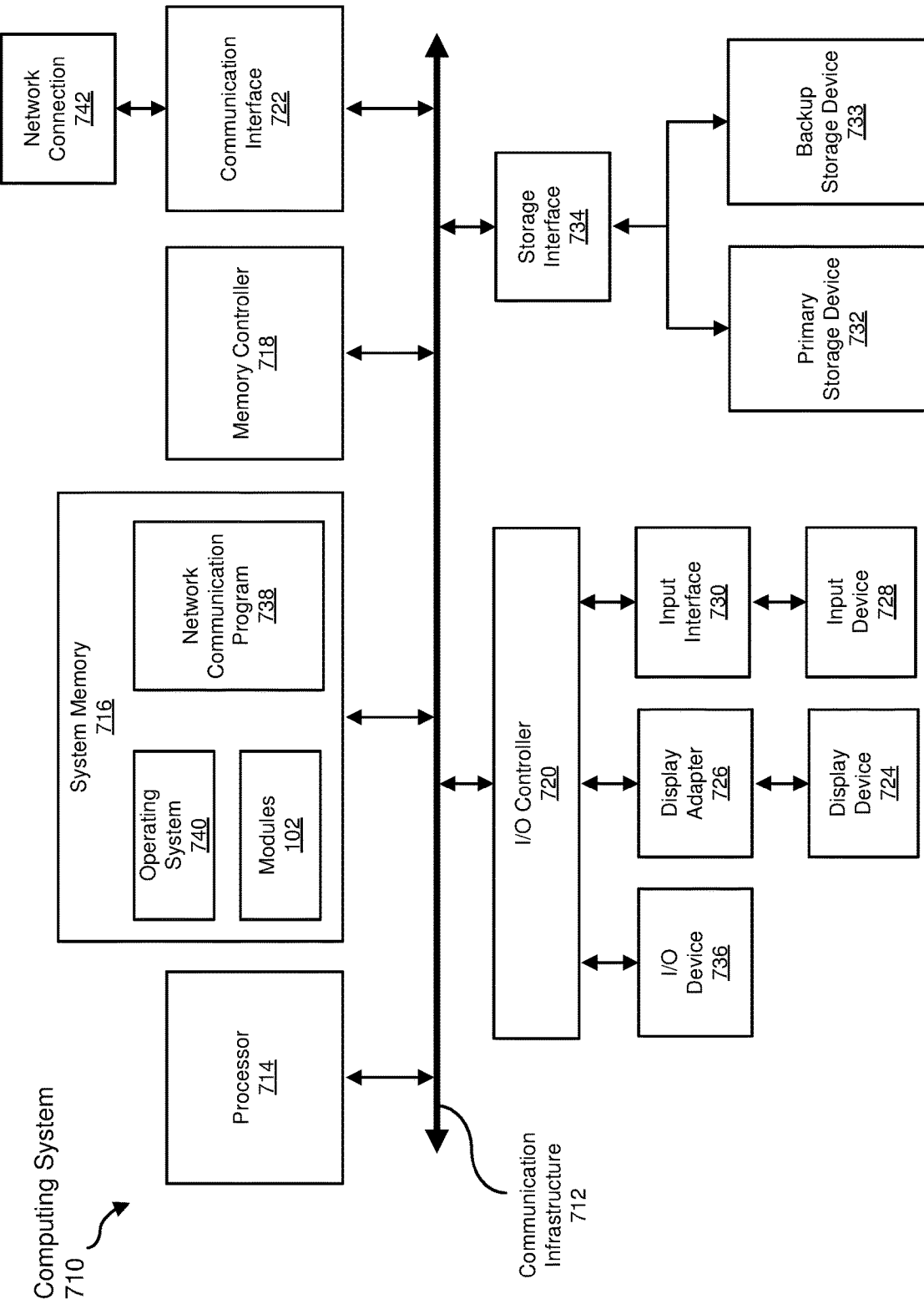
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
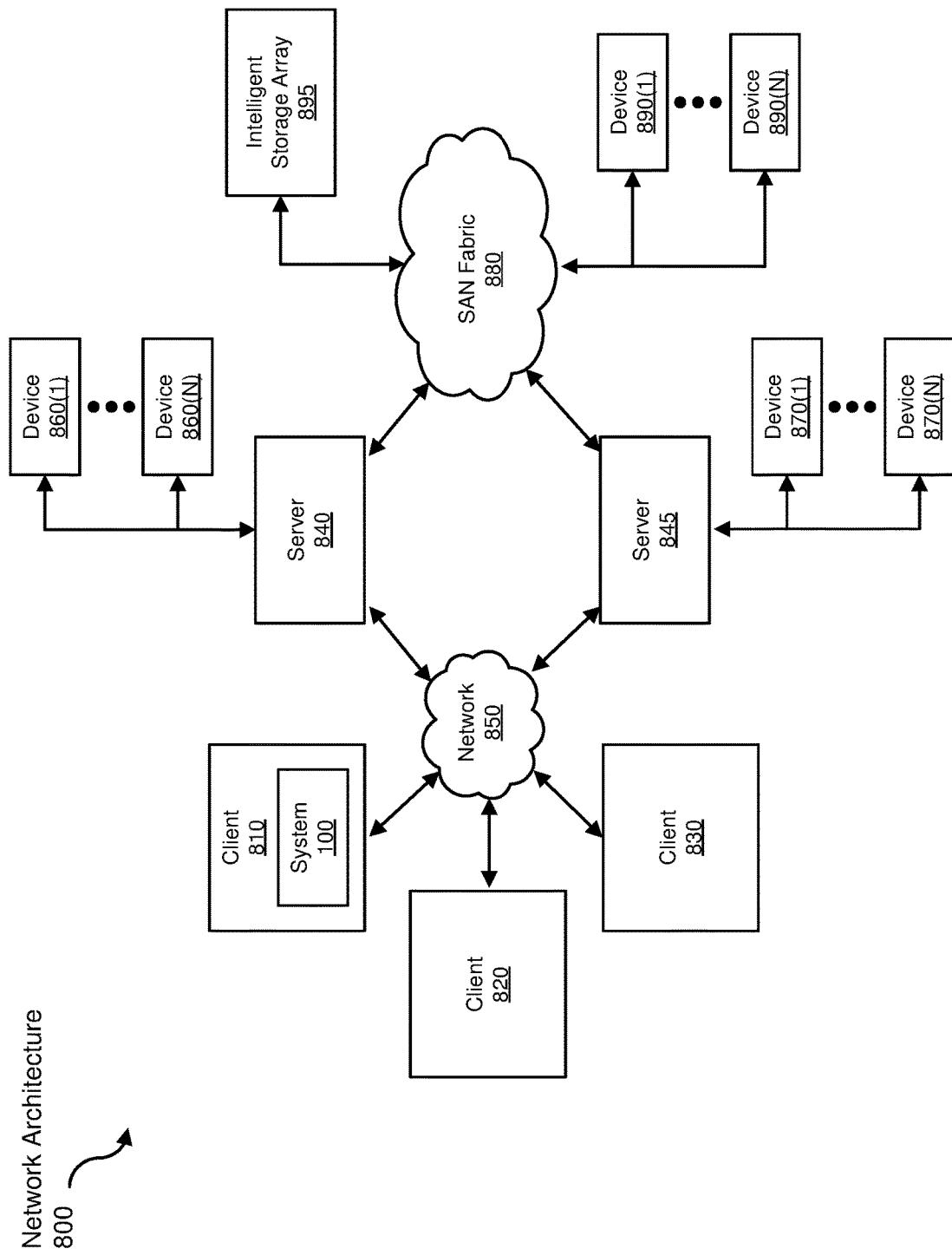
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850.

Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for validating a user's physical location.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a list of sensor-equipped devices connected to a local network, transform the list of sensor-equipped devices into a list of validation tasks, provide the list of validation tasks to a user through a user interface, receive signals from sensor-equipped devices represented on the list, use the signals to determine that the user has completed a series of validation tasks, and use a result of the determination to validate the user's physical location. The modules described herein may then output a result of the validation to an external authentication system, store a result of the validation to a storage device, and/or display a result of the validation to the user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for validating a user's physical location, at least a portion of the method being performed by a computing device comprising at least one physical processor, the method comprising:
   identifying a plurality of sensor-equipped devices that are connected to a local network and managed by a device-management application, wherein the local network is associated with a physical location served by the local network;
   deriving, by the device-management application, metadata for each sensor-equipped device in the plurality of sensor-equipped devices that describes a location of the sensor-equipped device and ways in which the users can interact with the sensor-equipped device;
   filtering, based on the metadata for each sensor-equipped device, the plurality of sensor-equipped devices to exclude sensor-equipped devices that are accessible to individuals outside the physical location;
   receiving, from an entity that provides a location-based service to end-users, a request to validate that a user is present at the physical location that is associated with the local network;
   instructing, in response to receiving the request and based on the metadata associated with each of the sensor-equipped devices, the user to interact with at least one sensor-equipped device in the plurality of sensor-equipped devices to demonstrate that the user is able to access the physical location;
   confirming, based on observing a response of the sensor-equipped device, that the user has interacted with the at least one sensor-equipped device; and
   validating, in response to confirming that the user has interacted with the at least one sensor-equipped device, that the user is present at the physical location.

2. The method of claim 1, wherein validating that the user is present at the physical location comprises providing evidence that the user is present at the physical location to a multiple-factor authentication system.

3. The method of claim 1, further comprising enabling, based on validating that the user is present at the physical location, a transaction that requires the user to be present at the physical location.

4. The method of claim 1, further comprising determining, based on validating that the user is present at the physical location, that the user lives at the physical location of the local network.

5. The method of claim 1, further comprising verifying the physical location of the local network.

6. The method of claim 5, wherein verifying the physical location of the local network comprises receiving information describing the physical location of the local network from a service provider to the local network.

7. The method of claim 1, wherein observing the response of the at least one sensor-equipped device comprises observing network traffic on the local network that originates from the at least one sensor-equipped device and occurs in response to the user interacting with the at least one sensor-equipped device.

8. The method of claim 1, wherein confirming that the user has interacted with the at least one sensor-equipped device comprises querying a remote backend service for recent interactions involving the at least one sensor-equipped device, wherein the remote backend service maintains a log of actions performed by the sensor-equipped device.

9. The method of claim 1, wherein observing the response of the at least one sensor-equipped device comprises receiving information from the at least one sensor-equipped device through an application programming interface of the sensor-equipped device.

10. The method of claim 1, wherein identifying the plurality of sensor-equipped devices comprises performing a device discovery operation on the local network that detects sensor-equipped devices that are connected to the local network.

11. The method of claim 1, wherein identifying the plurality of sensor-equipped devices comprises receiving a list of sensor-equipped devices from a smart home management application.

12. A system for validating a user's physical location, the system comprising:
 an identification module, stored in a memory of the system, that:
  identifies a plurality of sensor-equipped devices that are connected to a local network and managed by a device-management application, wherein the local network is associated with a physical location served by the local network;
  derives, by the device-management application, metadata for each sensor-equipped device in the plurality of sensor-equipped devices that describes a location of the sensor-equipped device and ways in which users can interact with the sensor-equipped device; and
  filters, based on the metadata for each sensor-equipped device, the plurality of sensor-equipped devices to exclude sensor-equipped devices that are accessible to individuals outside the physical location;
 a reception module, stored in the memory, that receives, from an entity that provides a location-based service to end users, a request to validate that a user is present at the physical location that is associated with the local network;
 an instruction module, stored in the memory, that instructs, in response to receiving the request and based on the metadata associated with each of the sensor-equipped devices in the plurality of sensor-equipped devices, the user to interact with at least one sensor-equipped device in the plurality of sensor-equipped devices to demonstrate that the user is able to access the physical location;
 a confirmation module, stored in the memory, that confirms, based on observing a response of the sensor-equipped device, that the user has interacted with the at least one sensor-equipped device;
 a validation module, stored in the memory, that validates, in response to confirming that the user has interacted with the at least one sensor-equipped device, that the user is present at the physical location; and
 at least one physical processor configured to execute the identification module, the reception module, the instruction module, the confirmation module, and the validation module.

13. The system of claim 12, wherein the validation module validates that the user is present at the physical location by providing evidence that the user is present at the physical location to a multiple-factor authentication system.

14. The system of claim 12, wherein the validation module enables, based on validating that the user is present at the physical location, a transaction that requires the user to be present at the physical location.

15. The system of claim 12, wherein the validation module determines, based on validating that the user is present at the physical location, that the user lives at the physical location of the local network.

16. The system of claim 12, further comprising a verifying module, stored in memory, that verifies the physical location of the local network.

17. The system of claim 16, wherein the verifying module verifies the physical location of the local network by receiving information describing the physical location of the local network from a service provider to the local network.

18. The system of claim 12, wherein the confirmation module observes the response of the at least one sensor-equipped device by observing network traffic on the local network that originates from the at least one sensor-equipped device and occurs in response to the user interacting with the at least one sensor-equipped device.

19. The system of claim 12, wherein the confirmation module confirms that the user has interacted with the at least one sensor-equipped device by querying a remote backend service for recent interactions involving the at least one sensor-equipped device, wherein the remote backend service maintains a log of actions performed by the sensor-equipped device.

20. A non-transitory computer-readable medium comprising one or more computer-readable instructions that, when executed by at least one processor of a computing device, cause the computing device to:
 identify a plurality of sensor-equipped devices that are connected to a local network and managed by a device-management application, wherein the local network is associated with a physical location served by the local network;
 derive, by the device-management application, metadata for each sensor-equipped device in the plurality of sensor-equipped devices that describes a location of the sensor-equipped device and ways in which users can interact with the sensor-equipped device;
 filtering, based on the metadata for each sensor-equipped device, the plurality of sensor-equipped devices to exclude sensor-equipped devices that are accessible to individuals outside the physical location;

receive, from an entity that provides a location-based service to end users, a request to validate that a user is present at the physical location that is associated with the local network;

instruct, in response to receiving the request and based on the metadata associated with each of the sensor-equipped devices in the plurality of sensor-equipped devices, the user to interact with at least one sensor-equipped device in the plurality of sensor-equipped devices to demonstrate that the user is able to access the physical location;

confirm, based on observing a response of the sensor-equipped device, that the user has interacted with the at least one sensor-equipped device; and validate, in response to confirming that the user has interacted with the at least one sensor-equipped device, that the user is present at the physical location.

\* \* \* \* \*